April 20, 1937.    W. H. LANE    2,077,630
DRAG
Filed Aug. 19, 1936
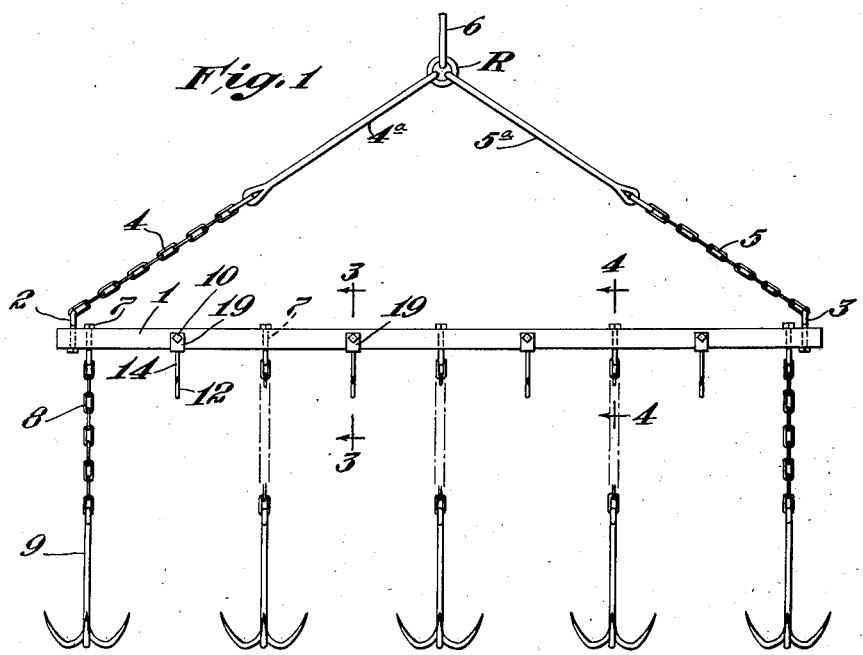
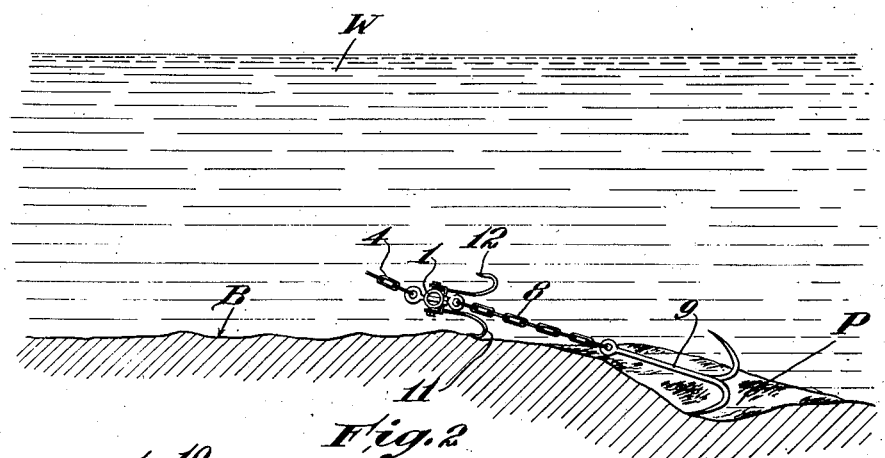
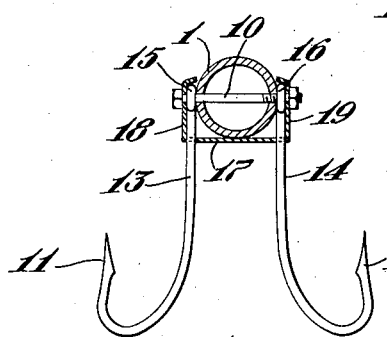
Inventor
William H. Lane
by Roberts Cushman & Woodbury
att'ys.

Patented Apr. 20, 1937

2,077,630

UNITED STATES PATENT OFFICE 2,077,630

DRAG

William H. Lane, Framingham, Mass.

Application August 19, 1936, Serial No. 96,739

8 Claims. (Cl. 294—66)

This invention pertains to drags designed for grappling submerged objects, for example the bodies of persons who have been drowned. Even under the most favorable conditions the process of dragging for submerged objects by the use of previous forms of grapple is difficult and uncertain. In most cases the precise location of the object being dragged for is unknown; the water is more or less opaque; and wind and weather make accurate guidance of the drag almost impossible. Moreover the material forming the bottom of a natural body of water is seldom if ever smooth and plain but on the other hand is usually highly irregular, comprising hills and valleys of varying height and depth and having scattered over it projecting stones or rocks, sunken logs and other debris, as well as vegetable growths, such as sponges, weeds or the like, and thus the problem of dragging the bottom for the recovery of a body lying thereon is not at all a simple one. In order to be practically effective it is necessary to sweep a substantial width of the bottom at each operation, since as above noted, due to the conditions under which the operation is performed, it is almost impossible to guide the drag with any degree of accuracy. In order to sweep a wide path the drag must be of substantial extent (perpendicular to its general path of movement) but if the drag be thus made of substantial width then the irregularities of the bottom become the source of much trouble since it may readily happen that the object being sought will lie in a pocket or narrow valley of the bottom or behind a rock or log so that as the drag is moved along in a gnerally horizontal position it will be so elevated by the higher adjacent portions of the bottom that its grapple devices will pass completely over and fail to grip the object sought. On the other hand, if dependence be placed solely upon large grapples flexibly connected to the crossbar of the drag, such large grapples, if encountering a body resting upon a substantially flat portion of the bottom or upon a surface which slopes downwardly and forwardly in the direction of the movement of the drag, may merely roll the body along and perhaps eventually deposit it in a depression and then pass over it without properly grappling it, whereas small grapple hooks rigidly connected to the drag bar, if encountering an object under such conditions, will effectively grapple it and permit it to be drawn to the surface.

The principal object of the present invention is to provide a drag which will function effectively for its intended purpose regardless of the condition of the bottom over which it is drawn and which may be relied upon to catch and hold objects even though the latter may lie in pockets or holes in the bottom as well as on elevations or substantially level surfaces. A further object is to provide a drag of effective type which is strong and durable and which may be made in effective widths so as to sweep a path of substantial extent as it is drawn over the bottom.

Other objects and advantages of the invention will be made manifest in the following more detailed description and by reference to the accompanying drawing wherein Fig. 1 is a plan view of a complete drag comprising the harness whereby it may be drawn along over the bottom which is to be dragged;

Fig. 2 is a view in vertical section through a body of water illustrating the action of the improved drag as it is drawn along;

Fig. 3 is a section to large scale substantially on the line 3—3 of Fig. 1; and

Fig. 4 is a section to large scale substantially on the line 4—4 of Fig. 1.

Referring to the drawing, the numeral 1 designates the transverse or bar portion of the drag, such transverse portion being elongate and rigid and being conveniently made from a length of metal pipe or tubing. For example, a piece of one inch standard pipe (preferably galvanized) and approximately four feet in length has been found desirable for the purpose, although it is, of course, to be understood that this bar may be made solid if preferred, and of any desired diameter and length convenient for handling, and in accordance with variations in the character of the bottom to be dragged and the depth of water in which it is to be used.

Preferably this bar 1 is provided near its opposite ends with diametrical openings for the reception of the shank portions of a pair of eye-bolts 2 and 3, respectively, (illustrative of any desired form of connecting means) the shanks of these bolts being substantially parallel to each other. To these bolts are secured the harness chains 4 and 5 which may be secured at their upper ends to a pair of convergent links 4ª and 5ª, respectively, which in turn are secured to a ring R to which may be attached the cable 6 by means of which the drag is drawn along the bottom. Obviously other arrangements of harness for pulling the drag may be employed if desired.

In accordance with the present invention the bar 1 is furnished with a series of diametrical openings preferably having their axes substantially parallel to those of the eye-bolts 2 and 3, the openings of this series being spaced apart for example a distance of eleven inches. Each of these openings receives the shank of an eye-bolt 7 (Fig. 4) which may be rigidly fixed in the bar 1 by means of a nut, or by welding or the like, although it is contemplated that the eye-bolts 7 may be arranged to swivel in the bar 1 if desired. To each of the eye-bolts 7 is secured a length of chain 8 to which in turn is secured one of a series of grapples 9. These grapples 9 are preferably of the multi-prong type and of substantial size and weight so that they will with certainty drop down into any pocket or cavity of the bottom across which they may be drawn. In place of chains, cables or ropes may be employed, although the chains are preferred. As here illustrated each chain 8 is of a length approximating the distance between adjacent eye-bolts 7, but the lengths of the chains may be varied as desired, although it is preferred that they be at least as long as here illustrated in proportion to the other parts of the device.

In the space between each pair of adjacent eye-bolts 7 and preferably substantially midway between such bolts, the bar 1 is furnished with openings for the reception of bolts or rivets 10 (Fig. 3). These bolts or rivets 10 preferably are disposed in a plane perpendicular to that defined by the axes of the eye-bolts 7, and each of these bolts or rivets 10 constitutes fastener means for attaching one of a second series of grapples to the bar 1. The grapples of this second series each preferably comprises a pair of hooks 11, 12 (for example hooks of the fish-hook type but with the barbs removed) each hook having a shank 13 and 14, respectively, provided at its end with an eye 15 and 16, respectively, the ends of the bolts or rivets 10 passing through the eyes of the respective hooks. In order securely to hold the hooks rigidly to the bar 1 and so that the hooks will always remain in such position that their curvatures are in planes substantially perpendicular to the axis of the bar, it is preferred to provide a clamping yoke for each pair of hooks. This clamping yoke may be made of sheet metal or the like and as here shown is of more or less U-shape in cross section, comprising the transverse member 17 and the substantially parallel legs 18 and 19. The transverse member 17 rests against the bar 1 while its leg portions are disposed at diametrically opposite sides of the bar 1, the leg portions having openings designed to receive the projecting ends of the bolt or rivet 10. The transverse member 17 is also furnished with openings which receive the shank portions 13 and 14 of the respective hooks. When the bolt 10 is tightened up the eye portions of the hooks are drawn firmly into contact with the bar 1 and since the yoke member is of substantial width (lengthwise of the bar 1) and since its transverse member 17 bears against the bar, it is substantially impossible for the yoke to tip and thus it acts rigidly to hold the hooks and prevent the latter from swinging about the axis of the bolt 10.

Referring to Fig. 2 which illustrates in general the operation of the drag, the letter W designates a body of water, and the letter B the bottom of such body of water, such bottom being irregular in contour and having depressions or pockets such as indicated at P. When the drag is drawn along the bottom, the series of grapples comprising the small sharp hooks 11 and 12 engages the high spots of the bottom and thus will come into contact with and effectively grapple any body which may be lying upon the exposed or elevated portions of the bottom. At the same time the larger grapples 9 of the other series, being flexibly connected to the bar 1 and being of substantial weight, will effectively drop down into any pockets or depressions in the bottom and may be depended upon to seize and draw up any object which may be lying in such depression and which could not be reached by the shorter hooks which are rigidly connected to the bar and which by reason of their rigidity and length of the bar could not reach down into sharp depressions or pockets of the bottom. Thus by combining the advantages of the rigidly supported relatively small and sharp grapple hooks with the relatively large but flexibly attached grapples 9 a much more reliable drag has been provided than has previously been known, and one which in actual service has been found to give far superior results to anything previously available.

While one desirable embodiment of the invention has been illustrated by way of example, it is to be understood that the invention is not necessarily limited to this precise arrangement but that other and equivalent parts and arrangements of parts may be substituted for those here specifically described and shown, without departing from the spirit of the invention, as defined in the accompanying claims.

I claim:

1. A drag of the class described comprising in combination a substantially rigid, elongate bar designed to lie in a substantially horizontal position while being dragged in a direction perpendicular to its length, and two series of grapples secured to the bar, the grapples of one series alternating with those of the other, means rigidly attaching the grapples of the first series to the bar, and flexible means connecting the grapples of the second series to the bar.

2. A drag comprising an elongate substantially rigid bar having a harness connected adjacent to its opposite ends, a series of relatively small grapples spaced longitudinally of the bar and rigidly attached thereto, a series of relatively large grapple hooks and an elongate flexible connection uniting each of the larger grapple hooks to the bar, each such flexible connection being secured to the bar in a space between a pair of grapples of the first series.

3. A drag of the class described comprising an elongate substantially rigid bar designed to lie in a generally horizontal position and to be dragged over the bottom of a body of water in a direction substantially perpendicular to its length, and two series of grapples attached to the bar, the grapples of one series being rigidly secured to the bar and designed and arranged to engage objects resting upon an elevated surface of the bottom, and the other series of grapples being connected to the bar by elongate flexible connections so designed and arranged as to permit the grapples of said second series to drop into depressions of the bottom.

4. A drag of the class described comprising an elongate rigid bar, means for dragging the bar in a direction substantially perpendicular to its length, a series of grapples each comprising a hook curved in a plane substantially perpendicular to the length of the bar, means rigidly securing the hooks of said series of grapples to the bar in spaced relation, a length of chain secured to the bar in each space between adjacent grapples of the first series, and a grapple hook attached to the free end of each chain.

5. A drag of the class described comprising an elongate rigid bar having eye-bolts adjacent to each end for attaching harness, whereby the bar may be dragged in a direction perpendicular to its length, the bar having a series of spaced holes whose axes are in a plane substantially perpendicular to that defined by the axes of the aforesaid eye-bolts, an elongate fastener extending through each of said holes, a pair of grapple hooks secured to the bar by each of said fasteners, the grapple hooks constituting each such pair being back-to-back and curved in a plane perpendicular to the axis of the bar, a second series of holes in the bar, each of said latter holes being substantially midway between adjacent holes of the first-named series, an eye-bolt secured in each hole of the second series, a length of chain attached to each latter eye-bolt, and a multiple-pronged grapple attached to the free end of each chain.

6. A drag of the class described comprising in combination a substantially rigid, elongate bar designed to lie in a substantially horizontal position while being dragged in a direction perpendicular to its length, and two series of grapples secured to the bar, the grapples of one series alternating with those of the other, chains attaching the grapples of one series to the bar, the length of each such chain being at least as great as the distance between the points of connection of adjacent grapples of said series to the bar, and means rigidly securing the grapples of the second series to the bar.

7. A drag of the class described comprising in combination a substantially rigid, elongate bar designed to lie in a substantially horizontal position while being dragged in a direction perpendicular to its length, and two series of grapples secured to the bar, the grapples of one series alternating with those of the other, elongate flexible connections uniting the grapples of one series to the bar, and means rigidly attaching each grapple of the other series to the bar, said attaching means comprising a rigid, substantially U-shaped yoke having legs disposed at diametrically opposite sides of the bar, said yoke having openings in its transverse member through which pass the shanks of the individual grapple hooks, and a fastener which passes respectively through the legs of the yoke, through an eye in the shank of each hook, and through a hole in the bar and thereby fixedly unites the several parts.

8. A drag of the class described comprising in combination a substantially rigid, elongate bar designed to lie in a substantially horizontal position while being dragged in a direction perpendicular to its length, and two series of grapples secured to the bar, the grapples of one series alternating with those of the other, one series of grapples each comprising a pair of hooks disposed back-to-back, each hook having a shank portion and an eye, a substantially U-shaped yoke associated with each such pair of hooks, each yoke embracing the bar and having a pair of openings in its transverse member for the passage of the shanks of its respective hooks, the yoke also having openings in its legs aligned with the eyes of the hooks, and a bolt which extends through the openings in the legs of the yoke, through the eyes of the hooks, and through a hole in the bar, and rigidly unites the hooks to the bar, and elongate flexible elements uniting the second series of grapples to the bar.

WILLIAM H. LANE.